United States Patent [19]

Smith et al.

[11] Patent Number: 4,983,125
[45] Date of Patent: Jan. 8, 1991

[54] DEVICE FOR MEASURING HUMAN PERFORMANCE

[75] Inventors: James C. Smith, Santa Monica; R. Wade Allen, Hermosa Beach; Henry R. Jex, Santa Monica, all of Calif.

[73] Assignee: Systems Technology, Inc., Hawthorne, Calif.

[21] Appl. No.: 430,490

[22] Filed: Nov. 1, 1989

Related U.S. Application Data

[63] Continuation-in-part of Ser. No. 157,240, Feb. 10, 1988, abandoned.

[51] Int. Cl.$^5$ .............................................. G09B 19/00
[52] U.S. Cl. ...................................................... 434/258
[58] Field of Search ..................... 434/29, 43, 258, 307

[56] References Cited

U.S. PATENT DOCUMENTS

| | | | |
|---|---|---|---|
| 3,357,115 | 12/1967 | Kelley | 434/258 |
| 3,483,302 | 12/1969 | Ashkenas et al. | 434/258 |
| 4,325,697 | 4/1982 | Regan et al. | 434/258 |

Primary Examiner—William H. Grieb
Attorney, Agent, or Firm—Edward A. Sokolski

[57] ABSTRACT

A device for measuring the ability of a human operator to stabilize an inherently unstable system so as to maintain an output signal on a display terminal within a preset limit. The difficulty is automatically increased at a relatively fast rate until the human operator approaches the limits of his ability to maintain the output signal within the limits. The difficulty is then increased at a relatively slow rate until the human operator is no longer able to maintain the output of the testing device within preselected limits. The device is mechanized using a general purpose microprocessor and utilizes binary shifts rather than multiplication or division operations in order to achieve real time operation at a sufficiently fast rate in order to test the limits of human ability. The device also provides for the measurement of the ability of the human operator after an adaptation or training period by maintaining the instability of the system at a predetermined level while monitoring and measuring the number of times that the human operator loses control of the output signal during a predetermined period of testing and by measuring and monitoring the period of time that elapses before the first loss of such control. The computational procedure utilized in the device includes provisions for avoiding a flickering effect that otherwise would appear on the display terminal.

6 Claims, 2 Drawing Sheets

DEVICE FOR MEASURING HUMAN PERFORMANCE

This is a continuation-in-part of application Ser. No. 07/157,240 filed Feb. 10, 1988 now abandoned, for a Device For Measuring Human Performance.

A microfiche appendix containing the Assembler Source (Code) Listing and the CBM-BASIC Source (code) listing was filed with the parent application and has been transferred to the present application. The microfiche includes one microfiche sheet forty frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

Many different types of equipment are operated or controlled by human operators in circumstances where the successful control of the equipment presupposes an alert human operator having suitably fast responses to external stimuli. For instance, the pilot of a plane must respond to his perceptions of aircraft motion and attitude with alacrity if he or she expects to fly the plane safely.

Of even more widespread importance, the driver of an automobile must be able to respond quickly and correctly to indications of danger in order to operate the automobile with relative safety.

Because of the importance of the accuracy and rapidity of the response of human beings to external stimuli in such circumstances, a simple device for measuring an individual's ability to respond and control is important. Such a device is useful for determining the limits of human ability, for determining which individuals are most capable, for screening individuals who have permanently impaired or subaverage abilities, and for detecting persons whose abilities are temporarily impaired. Such temporary impairment might, for instance, result from consumption of alcohol or use of other drugs. Detection of temporarily impaired persons may be used to forestall the operation of automobiles by intoxicated drivers.

2. Description of the Prior Art

A wide range of devices have been designed and built for the measurement of human response. For example, U.S. Pat. No. 3,483,302 ("302") describes an analog apparatus for measuring a human operator's performance. In the "302" patent a human operator, by manual control of the position of the sliding connection in a potentiometer, attempts to maintain the position of an output signal near the center or "zero" position on a cathode ray-tube display. The "302" measuring device utilizes an analog integrating feedback loop from the output of the device back to the input of the device to create an unstable device. By means of the adjustable potentiometer the operator also places a signal into the input of the unstable device and, by countering the signal fed back from the output, the human operator stabilizes the output.

In the "302" device, the gain in the feedback loop can be increased so as to make it more difficult for the human operator to maintain the output on the display within limits. In the "302" device, the difficulty in maintaining the output within set limits is adjusted by manually changing the gain of an operational amplifier within the analog feedback loop.

Prior art devices also provided for the automatic increase in the instability of the testing device at a relatively rapid rate from an initial level of instability until the operator began to exhibit difficulty in maintaining the output signal within preset limits. At such time the prior art device would shift to a lower rate of increase in the instability until the operator was no longer able to maintain the output signal within specified limits.

SUMMARY OF THE INVENTION

The present invention utilizes a digital microprocessor and appropriate programing to simulate an unstable device for operator testing in a manner analogous to that used in the "302" analog device. In addition the programming of the microprocessor of the present invention provides not only for the measurement of the point at which the human operator is no longer able to maintain the position of an output signal within predetermined limits on a video display device ("VDD"), but also provides for the measurement of and evaluation of the operator's ability to control the position of the output signal on the VDD at lower levels of instability for which the operator is able to maintain the position of the output signal within specified limits.

For tests where the instability of the testing device is increased until the operator is no longer able to maintain the output signal within preset limits, the programming in the present invention provides for an initially rapid increase in the instability of the testing device followed by a slow rate of increase in instability as the instability approaches the level at which the operator is no longer to maintain the output within preset limits.

The present invention also provides for the measurement and evaluation of operator performance over a period of time while the instability of the testing device is held constant at a level at which the operator is able to maintain the output signal within the preset limits for significant periods of time. For such fixed levels of instability the programming of the present invention provides for the automatic recentering of the output signal when the operator momentarily fails to maintain the output signal position within the preset limits. Such intermittent failures of the operator are recorded and included in the evaluation of operator performance. In order to provide a short adaptation or training period, the instability of the testing device increases from a first preselected level of instability to a second preselected "tracking" level of instability. The instability is then maintained constant at the "tracking" level until the human operator fails to maintain the output signal within the display limits. Upon such failure the level of instability is then recycled to the first preselected level of instability and then gradually again increased to the second level of instability so as to again provide the operator with readaptation.

At certain points in the computational process utilized in the present invention, binary shifts are used in place of multiplication and division operations in order to speed the computational process. The programming also provides for the synchronization of the computational process with the VDD so as to avoid a "flicker" effect in the output display.

DETAILED DESCRIPTION

In the following description of the preferred embodiment, cross-references appear in parenthesis to the portions of the assembler source listing filed as a microfiche appendix herewith which give effect to the described operations.

Figure 1:
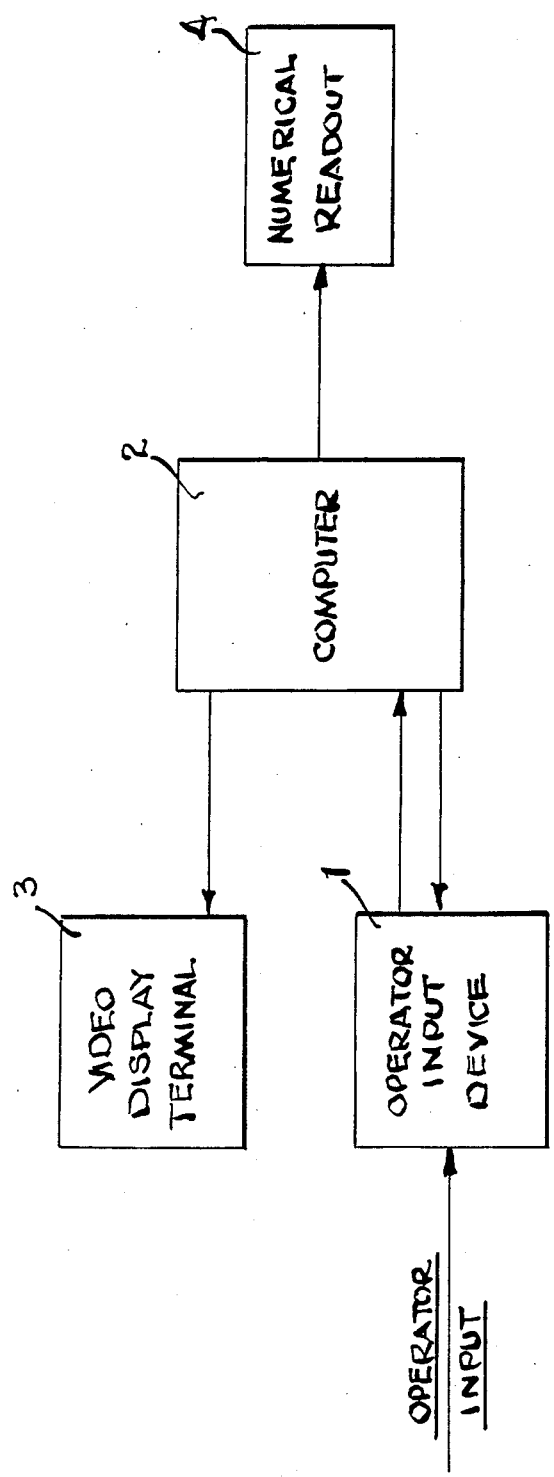
FIG. 1 is a block diagram of the invention.

Referring to FIG. 1, the human operator whose performance is being tested manually operates an operator input device 1 which sends a signal, responsive to the operator input, to computer 2 which in turn displays an output signal on video display device 3. In the one embodiment, the operator input device 1 is an analog controller commonly referred to as a "paddle" in the vernacular of video game technology; the computer is a Commodore 64 computer and the visual display device 3 is any of the video monitors commonly available for use with such computers. Computer 2 is programmed to cause visual display terminal 3 to display a tracking symbol such as square (or other symbol) on the video screen of the display. The program used in this invention causes computer 2 to simulate an unstable system such that the tracking symbol displayed on visual display device 3 tends to move to the left or right in an unstable manner from the center of the display. By movement of the "paddle" of the operator input device, the operator attempts to counteract or compensate for the instability and to maintain the tracking symbol near the central area of the display and within preset limits.

The invention provides two different, but related, procedures for testing the ability of the human operator to counteract the instability provided by computer 2 and maintain the displayed tracking symbol within predetermined limits. In the "auto-pacing mode", a multiplicative factor within a closed analog feedback loop that is simulated by the computer is increased so as to increase the instability of the simulated circuit until the operator fails to keep the displayed tracking symbol within the preset limits. The value of the multiplicative factor at the point of failure is used as a measure of the human performance. In the auto-pacing mode the value of the multiplicative constant is increased at first at a rapid rate until a level of instability is reached at which the human operator is beginning to have difficulty counteracting the instability. At this point, the multiplicative factor is increased at a much slower rate so as to more accurately determine the point at which the human operator is no longer able to maintain the displayed tracking symbol within the preset limits.

In the "sub-critical tracking mode" the invention does not continue to increase the value of the multiplicative factor as time passes until the operator fails to maintain the tracking symbol within the preset limits. The invention instead gradually increases the multiplicative constant from a first preselected level of instability to a second preselected level of instability, at which second level the multiplicative constant is held at a fixed value until the human operator fails to counteract the instability. The gradual increase of the instability from the first preselected level to the second preselected level provides a training or adaptation period for the operator. At the second preselected level of instability the invention measures the extent of the deviations of the displayed tracking symbol from the center of the screen and integrates the average value of this displacement over a period of time. When the tracking symbol moves outside of preset limits, the operator is considered to have lost control and the tracking symbol is reset to the center of the VDD and the level of instability is recycled to the first preselected level of instability and then gradually increased to the second preselected level of instability to give the operator another period of adaptation. The error integral together with the length of elapsed time before each loss of control and the number of such control losses, are used as measures of operator capability.

Figure 2:
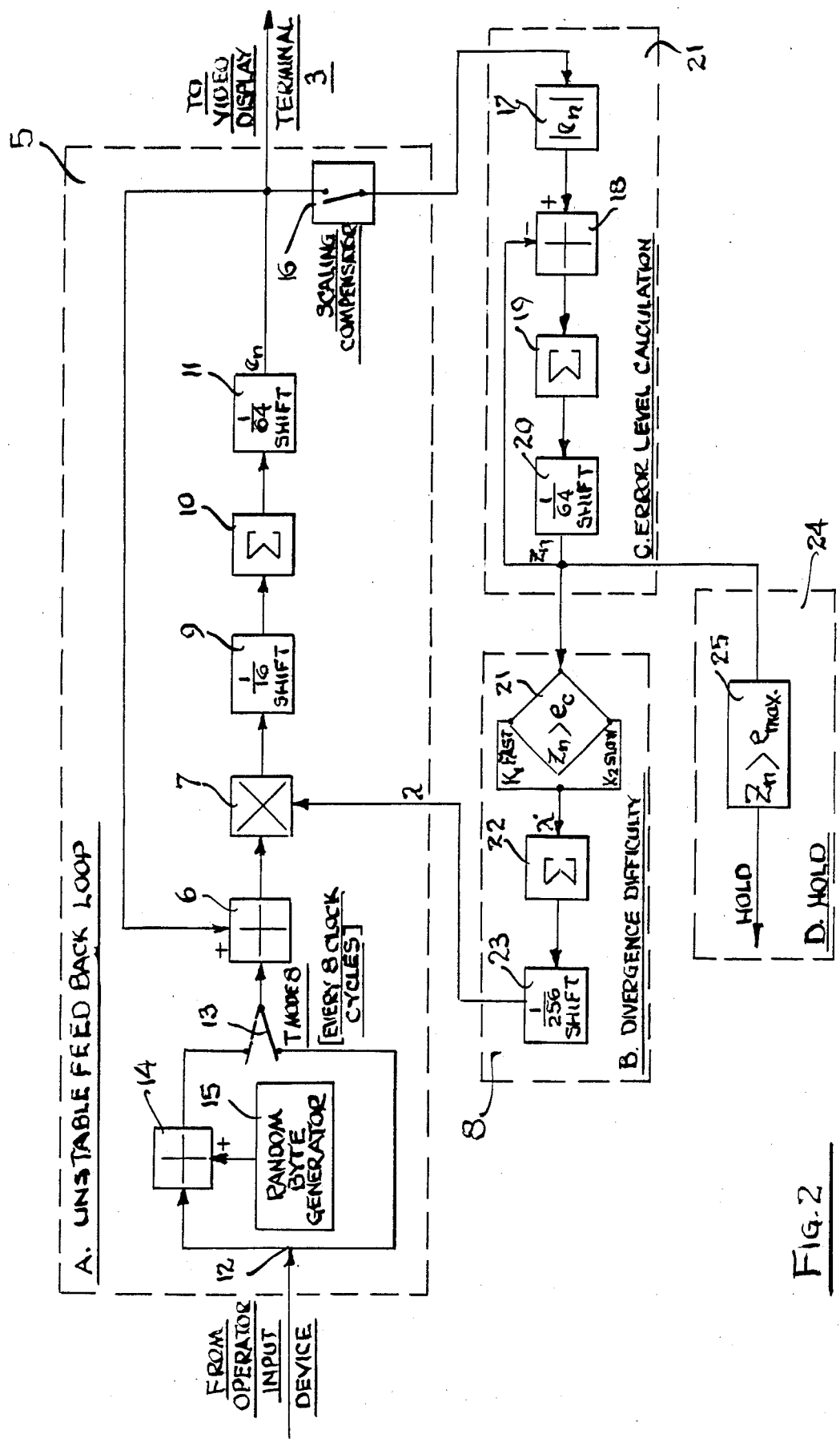
FIG. 2 is a diagram that illustrates conceptually certain of the processes carried out by the invention.

Referring now to FIG. 2 which is a block diagram depicting conceptually the operation of the computer in simulating a closed loop analog operational amplifier operating in an unstable manner. FIG. 2 depicts the "feedback" nature of the computations and also indicates the major computational steps used in the generation and control of the unstable system. Dotted lines are used in FIG. 2 to indicate groups of related steps in the computational procedure.

In the following descriptive material the references that are enclosed by parentheses are cross-references to the relevant portions of the Assembler Source (Code) Listing appearing in the microfiche appendix. For instance, the cross reference to "page 11, MULT.SUM" refers to the portion of the Assembler Source (Code) Listing immediately following the label "MULT.SUM" on page 11 within the microfiche appendix. Similarly the cross references to numbers such as ".50" refer to the temporary labels that appear on the left side of the Assembler Source (Code) Listing.

The computational operations enclosed within dashed rectangle 5 depict the process used to simulate an unstable system analogous to an operational amplifier having positive feedback. The output from the addition operation 6 is multiplied at 7 with a number, $\lambda$ obtained from the operations enclosed within dashed rectangle 8, which multiplicative number $\lambda$, determines the instability of the system. The code on page 11 of The Assembler Source Listing following the label MULT.SUM retrieves the present value of $\lambda$ from memory and performs a scaled 16 bit multiplication by the instantaneous value of the displayed error using iterative summation.page 11, MULT.SUM) The output of the multiplication operation 7 undergoes a binary shift to the right of four bits at block 9 thus effecting a division of the number by 16. (Page 11, DIVIDE BY 16) Successive numerical outputs from block 9 are, in effect, integrated by numerical summation at block 10. (Page 12, SUM.VALUES) The computational output of the summation operation 10 then undergoes a six-bit shift to the right thus effecting a division by 64 to provide the number denoted $E_n$ in FIG. 2. (Page 12, DIVIDE BY 64) The numerical value of $E_n$ is then transferred to the video display device where it is represented as a displacement of a square (or other symbol) from the center of video display device 3. (Page, 16 PLOT.XPOS)

As indicated in FIG. 2, the numeral value of $E_n$ also is applied to summation operation 6 thus computationally effecting positive feedback. The value $E_n$ is stored in location ERROR.FEED.IN in the code. (Page 13, CREATE.ERROR.FEED.IN).

Left alone, the computations described above would generate a numerical value of $E_n$ which would increase in magnitude exponentially and cause the square displayed on video display terminal 3 to go off screen to the left or right. The human operator, however, by means of the operator input device 1, depicted in FIG. 1, inputs a control position encoded as a numerical variable stored in location PADDLE.VALUE at the point 12 depicted in FIG. 2. (Page 10, DO.CTT) The number input by the operator may, for instance, be obtained from the instantaneous position of a paddle in the operator input device. The number that is input at point 12 normally is introduced directly into the summation operation 6 as indicated conceptually by switch 13. However, in order to avoid the "freezing" of the computational process at a conditionally stable number, e.g. at zero, the number introduced at 12 periodically has a random number added to it as depicted by block 14. (Page 10, RANDOM.NUMBER) The generation of the random byte is depicted by block 15. The operator input at 12, together with the random byte, is then periodically passed through to summation operation 6 as indicated conceptually by the operation of switch 13. In the preferred embodiment, a random byte is introduced once in every eight computational operations of the microprocessor.

Referring still to FIG. 2, the numerical value $E_n$ also undergoes a numerical scaling compensation as depicted by block pa 16. The absolute value of the scaled value, as depicted in block 17, is summed with the value of $Z_n$ as shown by block 18 and then accumulated or, in effect, integrated in the summation process depicted by block 19. (Page 12, line 1 SUM.VALUES) The output of block 9 then is shifted 6 bits to the right to effect a division by 64 as depicted by block 20 to give a number represented by $Z_n$ in FIG. 2. (Page 12,DIVIDE.BY.64) The value of $Z_n$, in turn, is negated and inserted in the summation operation depicted by block 18 to simulate an integrator with negative feedback (Page 13, CREATE.ERROR.FEED.IN,to .50) Thus, the operations depicted within dashed rectangle 21 generate a number $Z_n$ which represents, with some "damping", the average departure of the symbol on video display terminal 3 from the center of the display. $Z_n$ thus is an indicator of the success of the human operator in counteracting the instability of the computational system enclosed within dashed rectangle 5.

The "auto-pacing mode" of the present invention is effected by the computational steps represented in dashed rectangle 8. In block 21 the value of $Z_n$ determines whether a constant $K_1$ or a constant $K_2$ will be used in the computational process represented by block 22 (Page 15."IS.ERROR.PASS.ESLOW"). If MAX ($Z_n$) is less than a predetermined value $E_c$, a relatively large value $K_1$ is used and if MAX ($Z_n$) is greater than a preselected value $E_c$, then a smaller value $K_2$ is used. $K_1$ and $K_2$ correspond, respectively, to a relatively rapid and relatively slow rate of increase in the multiplicative number used in multiplication operation 7 and hence correspond to a relatively rapid and a relatively slow rate of increase in the instability of the computational system. Block 22 represents, in effect, the integration by a sequence of summations of the initial value for $\lambda$, denoted $\lambda$, with successive values $K_1$ or $K_2$ during each computational cycle. The computational output from block 22 then undergoes a binary shift of eight bits to the right thus effecting a division by 256 in block 23 to obtain the numerical value of the multiplicative factor $\lambda$, that is used in the multiplication operation 7. (Page 17, DIVIDE.LAMDA.BY.64)

The computational operations depicted in dashed rectangle 24 represent the termination of the test in the "auto-pacing mode" at the point where the excursions of the square displayed on video display terminal 3 exceed preset limits. As depicted by block 25, when the value $Z_n$ is greater than a preselected value $E_{max}$, the computational processes represented in dashed rectangles 5, 8 and 21 are placed on hold or "frozen" and the current value of $\lambda$ is then a number, i.e., a "critical-instability score" which is used to represent the ability of the human operator to compensate for the instability of the system. (Page 13, (CREATE.ERROR.FEED.IN) The instruction INC TEST.STATE at temporary label .50 instructs the program to cease dynamic calculation and to into "HOLD" mode.

In order for the computations described above to be carried out in the Commodore 64 microprocessor at a sufficiently fast rate to simulate an unstable system for testing purposes, the binary shifts depicted by blocks 9, 11, 20 and 23 are used rather than lengthy computational division operations that would slow the computational process significantly.

In the "sub-critical tracking mode" the value of $\lambda$ is increased from a first preselected level to a second preselected "tracking" level after which the instability is maintained constant until the human operator fails to maintain the output signal within the display limits. Following such failure, the degree of instability is returned to a first preselected level and then gradually again increased to the second preselected "tracking" level of instability. The instability is then maintained constant at the second pre-selected level until the human operator again fails to maintain the output signal within the display limits. (Page 16, CMP SLOW.- SCREEN.WIDTH). The test on page 16 at temporary label .47 CMP SLOW.SCREEN WIDTH determines if the error criterion for setting the second predetermined (slower) rate for incrementing $\lambda$ has occurred. The test at LAMBDA.LIMIT? on page 18 checks to determine if $\lambda$ has reached its maximum predetermined limit. If so, it is held at that value.

The test PASS. OR. FAIL.YET on page 19 checks to see if a display excursion exceeding the predetermined screen limit (boundary) has occurred. If true, the program branch either terminates or restarts the test depending upon the setting of SUB.CRITICAL.FLAG. The code on page 20 following the label "READ.- FIRE.BUTTON" determines whether the "AUTO- RESTART" option for Sub-critical tracking has been selected. If this option flag is true, an error excursion into the "exceedance" zone on the display causes $\lambda$ to be reset to its first preselected level and the test to be automatically restarted. If this option flag is false, the test goes into "HOLD" mode wherein the dynamics are frozen and the test results are displayed. The actual housekeeping functions required for auto-restart are performed at the remark "* --TEST FOR AUTO RE- START FLAG" on page 14 of the Assembly Source (Code) Listing.

The performance of the human operator is measured by any of a number of different indicators. For instance the value of $Z_n$ may be sampled at prescribed intervals and a specified number of such samples added together to obtain a numerical indication of performance. The samples are taken only during the periods for which the level of instability is at the level of the preselected "tracking" level. The code at label CREATE.ER- ROR.FEED.IN on page 13 of the listing calculates the smmoothed absolute error at each instant during tracking. If the Sub-critical flag is true, these values are stored at successive individual memory locations until the overall test interval expires.

The code at "PAST.LIMITS" (page 13) is the mechanization of the second scoring algorithm for subcritical tracking in which number of times the tracking symbol moves outside of a pre-set limit is counted. In this mechanization, a large, non-valid value for $z_n$ is stored in a memory location. Following termination of the test, the executive module then counts the number of times the tracking symbol moved outside of the pre-set limit exceedances to determine the number of control losses achieved during the run. The elapsed time during the test between incidents of control loss also may be used as an indicator of operator ability (page 24, "UPDATE.SECONDS.DISPLAY" through page 25,".90"). Finally, the number of control losses that occur during a testing period of predetermined length can be used as a performance indicator.

In the "sub-critical tracking mode", when control is lost, the computational feedback loop connecting $E_n$ to the summation operation indicated by block 6 in FIG. 2 is suspended until the operator initiates a restart of the task. The provisions in the programming for the temporary suspension of the feedback appear at lines 3 through 28 on line 14 of the Assembler Source Listing. The code following the remark "*DISPLAY PASS-/FAIL?" on page 14 is the beginning of the "Hold mode" operation, wherein the computational feedback loop is suspended until the operator initiates a restart of the task. This code section tests for a number of parameters which select elements of the display. These optional elements include screen colors, "PASS or FAIL", numerical values of λ and elapsed time. The code following the remark "* --SUBCRITICAL TRACKING ERROR SCORING" and ending at ".90" on page 15 provides for the sampling of $Z_n$ at periodic intervals throughout a sub-critical tracking run and for the recording of these values. The code following WRITE-.ERROR on page 15 of the listing provides for the measurement of and the recording of the elapsed time of the run before the occurrence of a control loss. The code following the label "PAST LIMITS" on page 13 records control losses by placing a specific non-valid value ofr $z_n$ in one of the memory locations reserved for instantaneous error values. After the test has timed out, these values are tallied to determine the number of control losses during a run of a predetermined period of length.

In order to avoid a flickering effect in the output display, the computational process in the microprocessor is synchronized with the scanning of the electron beam or "flying spot" in the video display device. The video display device utilizes a flying spot which scans the screen of the cathode ray tube of the device and paints a picture over the screen once each 1/60th of a second. Both the Commodore 64 computer and the video display device are powered by alternating current at 60 Hz. The painting of the image on the video display device screen and the computational processes within the Commodore 64 are both synchronized with the 60 Hz line current. The flicker is avoided by making sure that the position of the tracking symbol is updated only during the period in which the flying spot is blanked out and being moved to the top of the scan. The synchronization of the dynamic computations with the video display is accomplished by executing all dynamic computations within the "vertical blanking interval" (VBI) of the display. This is the period during which the CRT screen is blank and the "flying spot" is being repositioned to the upper left corner of the display by the video controller within the computer. In most computers, including the Commodore 64, an interrupt signals either the beginning or the end of this interval, so that screen animation is possible. In this mechanization all of the dynamic computations are performed during this vertical blanking interval so that their consequences are not displayed until the next frame. The computational loops are carefully timed so that in no case do they exceed the length of the VBI. The code executed during the VBI is entered by substituting the address of the code section of the vector used by the VBI interrupt and by terminating the code section with an RTI (Return From Interrupt) machine instruction. This code beings at the label VB on page 9 of the listing and ends with the instruction "JM $EA31" on page 22. This last instruction causes an RTI to be executed from the Commodore's ROM memory after first adjusting the stack pointer to assure re-entrancy.

In the absence of corrective steps the use of the binary shifts in the computational processes represented by blocks 9, 11, 20 and 23 in FIG. 2 (that is the divisions by a power of 2 such as 64) causes a computational discrepancy between the integration time constant —3 (1/64) and the actual frame interval in seconds (1/60). In the preferred embodiment, however, this discrepancy is avoided by programing logic that causes the time-locked calculations to be skipped once each 15 calculations, that is, the microprocessor calculations are carried out as described above for 15 computational cycles and then are skipped during the period of time that would be occupied by a 16th computational cycle. The code sections labeled as synchronizer and secondary branch point on lines 1 through 15 of page 10 and lines 21-28 of page 17 of the assembler source listing accomplish this compensation.

I claim:

1. A device for measuring the level of the ability of a human operator to stabilize an inherently unstable system so as to maintain an output signal within a preset limit, wherein the difficulty of maintaining stabilization of the device is increased until the human operator is no longer able to maintain the output signal with the preset limit, comprising:

a microprocessor;
an output display device;
an operator control device;
the microprocessor, by means of an adjustable multiplicative factor within a positive computational feedback loop, providing an adjustably unstable output signal responsive to the input by the human operator to the operator control device; the size of the multiplicative factor determining the degree of the instability exhibited by the positive computational feedback loop being dynamically adjustable;
multiplicative factor control means for dynamically adjusting the size of the multiplicative factor;
the output display device providing a visual display of the output signal from the microprocessor, the display of which output signal tends to diverge from a zero reference;
said operator control device including means for inputting a human operator controlled input signal from the operator control device to the computer to counteract the divergence of the displayed output signal from the zero reference;

computational smoothing means for obtaining the absolute value of the computational output signal and outputting same as a smoothed output signal;

means for increasing the multiplicative factor, and hence the instability of the output signal at a first preselected rate until the smoothed output signal exceeds a first preselected error level, and then increasing the multiplicative factor at a second preselected rate until the smoothed output signal exceeds a second preselected error level;

the second preselected rate being less than the first preselected rate and the second preselected error level being greater than the first preselected error level;

means for freezing the size of the multiplicative factor at the point at which the smoothed output signal exceeds the second preselected error level, the size of the frozen multiplicative factor being a measure of the ability of the human operator to compensate for the instability of the system;

means for retaining in memory, as an error level defined as a critical-instability score, the magnitude of the multiplicative factor at the time when the smoothed output signal exceeds the second preselected error level;

the positive computational feedback loop comprising:

first summing means for adding the output from the operator input device and the computational output signal from the computational feedback look to form a first sum;

first product means for forming a first product by multiplying the first sum by the adjustable multiplicative factor;

first quotient means for forming a first quotient by dividing the output of the first product means by the factor of 16, the first quotient being obtained by the binary shift to the right by four bits of the product while maintaining the sign of the product;

moving average means for forming a moving average of the first quotient by calculating a moving average of the four immediately previously computed values for the first quotient;

second quotient means for forming a second quotient by dividing the moving average by a factor of 64, the second quotient being obtained by the binary shift to the right by six bits of the moving average while maintaining the sign of the moving average;

the second quotient being the output signal from the computational feedback loop;

and wherein the computational smoothing means comprises means for scaling and calculating the absolute value of the output signal;

difference means for calculating a first difference between the scaled absolute value of the output signal and the smoothed output signal;

second moving average means for calculating a second moving average of the first difference between the scaled absolute value of the output signal and the smoothed output signal;

scaling means for calculating a third quotient equal to the division of the second moving average by 64, the third scaling means effecting the division by the binary shift to the right by six bits while maintaining the sign of the second moving average, the third quotient constituting the smoothed signal.

2. The device described in claim 1 wherein the computational smoothing means comprises:

scaling compensator means for scaling the output signal;

absolute value means for calculating the absolute value of the scaled output signal;

means for providing a smoothed output signal responsive to the absolute value of the scaled output signal.

3. The device described in claim 2 and additionally comprising:

means for introducing a small random disturbance into the computational feedback loop.

4. A device for measuring the level of the ability of a human operator to stabilize an inherently unstable system so as to maintain an output signal within a preset display limit wherein the difficulty of maintaining stabilization of the device is increased from a first preselected level of instability to a second preselected level of instability said second level being defined as a tracking level and then held at the second preselected level and the length of time that elapses before the operator loses control of the device is used as a measurement of such level of ability, comprising:

a microprocessor;

an output display device;

an operator control device;

the microprocessor, by means of an adjustable multiplicative factor within a positive computational feedback loop, providing an adjustably unstable output signal responsive to the input by the human operator to the operator control device; the size of the multiplicative factor determining the degree of the instability exhibited by the positive computational feedback loop; the size of the multiplicative factor being dynamically adjustable;

multiplicity factor control means for dynamically adjusting the size of the multiplicative factor;

the output display device providing a visual display of the output signal from the microprocessor, the display of which output signal tends to diverge from a zero reference;

said operator control device including means for inputting a human operator controlled input signal from the operator control device to the computer to counteract the divergence of the displayed output signal from the zero reference;

means for gradually increasing the level of instability from the first preselected level to the second preselected level after which the level of instability is maintained constant until the human operator fails to maintain the output signal within preselected limits on the output display device; and means for monitoring and measuring the elapsed time between the point in time the level of instability reaches the second preselected level and the point in time at which the human operator fails to maintain the output signal within preselected limits on the output display device.

5. A device for measuring the level of the ability of a human operator to stabilize an inherently unstable system so as to maintain an output signal within a preset display limit wherein the difficulty of maintaining stabilization of the device is increased from a first preselected level of instability to a second preselected level of instability said second level being defined as a tracking level and then held at the second preselected level and the number of times that the operator loses control of the device during a preselected period of time is used as a measurement of such level of ability, comprising:

a microprocessor;
an output display device;
an operator control device;
the microprocessor, by means of an adjustable multiplicative factor within a positive computational feedback loop, providing an adjustably unstable output signal responsive to the input by the human operator to the operator control device: the size of the multiplicative factor determining the degree of the instability exhibited by the positive computational feedback loop; the size of the multiplicative factor being dynamically adjustable;
multiplicity factor control means for dynamically adjusting the size of the multiplicative factor;
the output display device providing a visual display of the output signal from the microprocessor, the display of which output signal tends to diverge from a zero reference;
said operator control device including means for inputting a human operator controlled input signal from the operator control device to the computer to counteract the divergence of the displayed output signal from the zero reference;
means for gradually increasing the level of instability from the first preselected level to the second preselected level after which the level of instability is maintained constant until the human operator fails to maintain the output signal within preselected limits on the output display device;
means for recycling the level of instability to the first preselected level of instability and increasing the level of instability from the first preselected level of instability to the second preselected level each time the human operator fails to maintain the output signal within the preselected limits on the output display device.
means for monitoring and recording the number of times that the human operator fails to maintain the output signal within preselected limits on the output display device during a preselected period of time.

6. The device described in claims 1,2, 3,4 or 5 and further including means for avoiding scaling errors in the display of the output signal on the output display unit by periodically suspending the computational process within the computational feedback loop.

* * * * *